May 12, 1936.  O. N. WISWELL  2,040,584
DEVICE FOR HANDLING CANNED FLUIDS
Filed Jan. 9, 1934  2 Sheets-Sheet 1
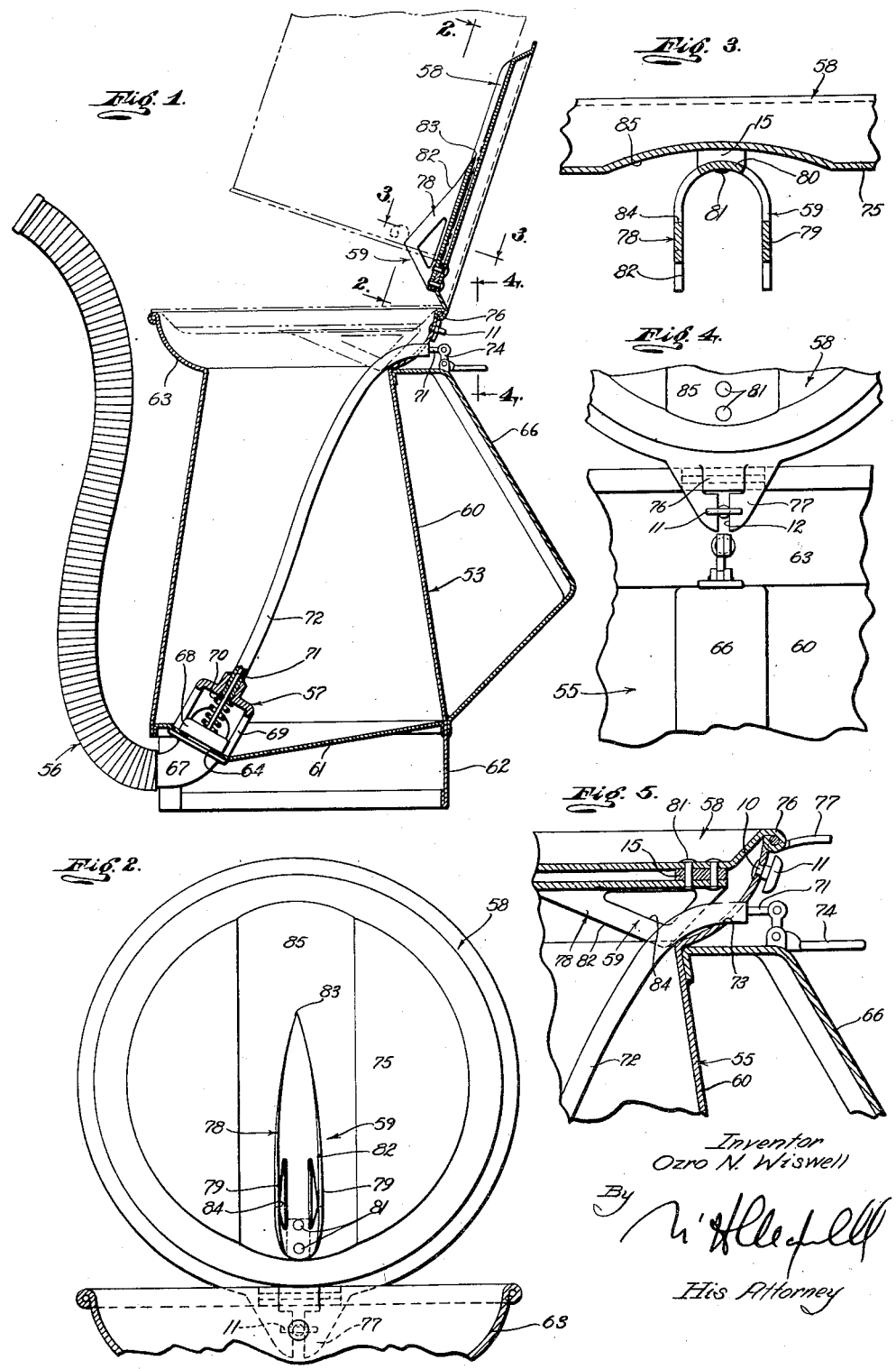
Inventor
Ozro N. Wiswell
By
His Attorney

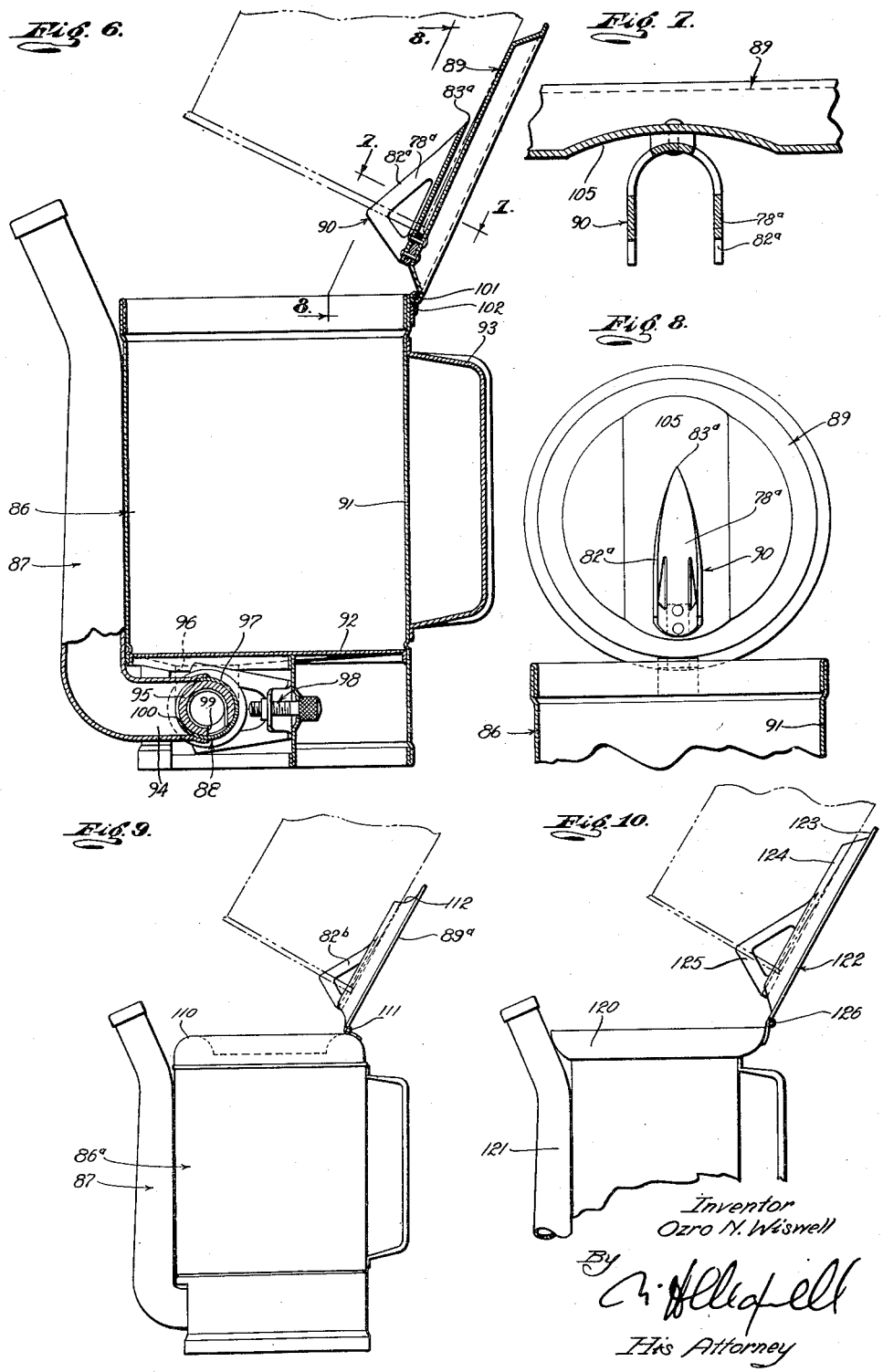

Patented May 12, 1936

2,040,584

UNITED STATES PATENT OFFICE 2,040,584

DEVICE FOR HANDLING CANNED FLUIDS

Ozro N. Wiswell, Los Angeles, Calif., assignor to Swingspout Measure Company, Los Angeles, Calif., a corporation of California Application January 9, 1934, Serial No. 705,889

15 Claims. (Cl. 221—23)

This invention relates to a device for handling canned fluids and relates more particularly to a can opening and fluid dispensing device. It is a general object of the present invention to provide a simple, practical and effective device for opening containers of oil, and the like, and for handling or dispensing the contents thereof.

It is another object of the invention to provide a liquid dispensing receptacle having a practical and convenient means for opening cans to allow their contents to quickly drain into the receptacle and which includes a valve-controlled discharge spout for pouring or dispensing the fluid from the receptacle.

It is another object of the invention to provide a dispensing receptacle having a can opening cutter operatable to open a can pushed or forced onto it, said cutter being formed and positioned so that the force imparted to it during the opening of a can has no tendency to tip or overturn the receptacle.

It is another object of the invention to provide a dispensing receptacle having means for opening a can or container to allow its contents to freely drain into the receptacle without loss or spilling of the fluid and without soiling or wetting the exterior of either the receptacle or the container.

It is another object of the invention to provide a device for handling canned fluids that includes a receptacle, means carried by the receptacle operatable to open a can so that its contents are free to quickly and entirely drain into the receptacle, and to thereafter temporarily and releasably hold the opened can in a tilted draining position, and a shiftable spout on the receptacle capable of insertion in the oil receiver of an engine, or the like, for pouring the fluid therein that is adapted to hold or support the receptacle on the oil receiver.

It is another object of the invention to provide a dispensing receptacle having a cover for closing its upper end and a means for opening sealed containers or cans that is rendered operative upon shifting of the cover to its opened position.

It is another object of the invention to provide a dispensing receptacle having a cover shiftable between a position where it closes the upper end of the receptacle and an opened position, and a cutter on the under side of the cover made accessible and rendered operative to cut an opening in a can pushed onto it when the cover is shifted or moved to its opened position.

It is another object of the invention to provide a fluid-handling device of the character mentioned including a receptacle, a cover for the receptacle, and a cutter on the under side of the cover made accessible for use by opening the cover, the inner side or surface of the cover forming an effective guide for guiding a can on to the cutter to be opened thereby.

It is a further object of the invention to provide a dispensing receptacle having a valve-controlled outlet and a shiftable or flexible discharge spout at the outlet and a practical and effective means carried by the receptacle for opening the containers to allow their contents to quickly drain into the receptacle.

Other objects and features of the invention will be better and fully understood from the following detailed description of typical forms and applications of the invention, throughout which description, reference is had to the accompanying drawings, in which:

Fig. 1 is a vertical detailed sectional view of one form of the invention showing the cover in the open position where the cutter is exposed for operation and illustrating in broken lines the cover in its closed position. Fig. 2 is an enlarged elevation of the inner side of the cover being a view taken substantially as indicated by line 2—2 on Fig. 1. Fig. 3 is an enlarged fragmentary detailed sectional view taken as indicated by line 3—3 on Fig. 1. Fig. 4 is a fragmentary exterior view taken as indicated by line 4—4 on Fig. 1. Fig. 5 is a fragmentary vertical sectional view of the cover in its closed position. Fig. 6 is a vertical detailed sectional view of another embodiment of the invention illustrating the cover in the open position where the cutter is accessible for use. Fig. 7 is an enlarged fragmentary sectional view taken as indicated by line 7—7 on Fig. 6. Fig. 8 is an elevation view of the inner side of the cover, being a view taken as indicated by line 8—8 on Fig. 6. Fig. 9 is a side elevation of still another form of the invention illustrating the cover of the receptacle in the open position where the can opening means is accessible for use, and Fig. 10 is a fragmentary side elevation of still another form of the invention showing the cover in the open position with the cutter in its operative position.

The embodiment of the invention illustrated in Figs. 1 to 5 inclusive of the drawings, includes, generally, a receptacle body 55, a flexible spout 56 on the body, valve means 57 for controlling the flow of fluid from the interior of the body 55, a cover 58 for the body 55, and means 59 carried by the cover 58 for opening a can to allow its contents to drain into the receptacle body 55.

The body 55 of the receptacle is provided to receive oil or the like from cans opened by the means, 59, or fluid from any other source. The body 55 includes a shell or side wall 60 and a bottom wall 61. The side wall 60 flares downwardly, being of an increasing diameter, and terminates at its lower end in a cylindrical base part 62. A flaring or concaved outwardly projecting rim 63 is provided on the upper end of the side wall 60. The bottom wall 61 is spaced above the lower end of the body, being arranged at the lower end of the side wall 60. A suitable handle 66 is provided on the body 55.

The spout 56 is provided to discharge or drain the fluid from the body 55 and is flexible so that it may be readily shifted or bent to discharge as desired. The spout 56 may be formed of any suitable type of flexible conduit or tubing, it being preferred to form the spout of a flexible metal tubing. The lower end of the flexible spout 56 is connected with a tubular fitting 67 extending outwardly from the opening 64. A vertical opening or slot is provided in the base wall 62 to pass the spout 56.

The valve means 57 is operatable to govern the discharge of fluid from the interior of the receptacle body 55 to the spout 56. In accordance with the invention, the valve means 57 is adapted to be operated or governed by a finger or the thumb of the operator's hand, at or engaging the handle 66. The means 57 includes a valve 68 for cooperating with a seat around the opening 64, to close the opening. A crown or cage 69 is provided to carry the valve and guide the valve for movement into and out of cooperation with the seat. The cage 69 is perforated to allow for the flow of fluid from the interior of the body 55 outwardly through the opening 64. A spring 70 is arranged under compression between the valve 68 and the outer part of the cage 69 to normally yieldingly hold the valve in its closed position. An operating member 71 in the form of a flexible rod or wire is attached to the valve 68 and extends outwardly through the spring 70 and cage 69. The operating member extends upwardly through the body 55 to the rim 63 at a point adjacent the upper end of the handle 66. Suitable tubing or a tubular guide 72 may be provided to guide and protect the flexible operating member 71. The guide tube 72 projects through an opening 73 in the rim 63 to carry the upper end of the operating member 71 to the outer side of the body at the upper end of the handle 66. An operating bell crank or pivoted lever 74 is provided on the handle 66 and is operatively connected with the operating member 71. The lever 74 is adapted to be engaged or depressed to open or unseat the valve 68 and thus allow the fluid in the receptacle body 55 to flow out through the spout 56.

The cover 58 is provided to close the upper end of the receptacle body 55 against the entrance of dust or foreign matter and in accordance with the invention, carries the can-opening means 59. The cover 58 is a substantially disc-shaped member proportioned so that its peripheral edge portion is adapted to rest or seat on the upper edge of the rim 63. The major or central portion 75 of the cover 58 is bent inwardly or indented to be received within the flaring rim 63 when the cover is in its closed position. A suitable pivot or hinge connection 76 connects the cover with the rim 63 so that the cover may be operated between its closed position and its open position.

A stop lug 77 is provided on the cover at the hinged connection 76 to limit the outward swinging or movement of the cover. When the cover is in the closed position the lug 77 projects from the cover to form a handle thereon whereby the cover may be readily opened. In the preferred construction, the peripheral edge portion of the cover 58 is hingedly connected with the rim 63 at a point adjacent or directly above the handle 66. The lug 77 of the hinge connection limits the opening of the cover 58 to stop the cover in a position where it is inclined downwardly and inwardly toward the center of the receptacle body 55.

Means is provided for latching or releasably locking the cover 58 in the open position. A rotatable bolt or pin 10 projects from the rim 63 below the hinge connection 76. The pin 10 has a transverse head 11 on its outer end. An opening or slot 12 is provided in the lug 77 to pass or receive the pin and its head 11. When the cover 58 is in the open position, the pin 10 passes through the slot 12 and may be turned to position its head 11 transversely of the slot to lock the cover against movement.

The means 59 for opening the sealed containers or cans is positioned on the inner or under side of the cover 58 to be housed within the rim 63 of the receptacle when the cover is in its closed position and to be exposed and accessible for use when the cover is in its inclined open position. The opening means 59 includes a cutter 78 attached to or mounted on the inner side of the cover 58 in longitudinal or axial alignment with the hinged connection 76. The cutter 78 is substantially U-shaped in transverse cross section, having spaced longitudinal side parts 79 and a transversely curved outer part 80 connecting the side parts 79. The lower end portion of the outer part 80 is attached to the inner side of the cover 58 by bolts or rivets 81. A spacer or block 15 holds the outer part 80 of the cutter spaced from and substantially parallel with the inner surface of the cover. The cutter 78 is preferably attached to the inner side of the cover 58 adjacent the periphery of the indented portion 75 of the cover and at a point directly above and adjacent the hinged connection 76. The inner longitudinal edges 82 of the side parts 79 are inclined upwardly and outwardly (considering the cover 58 in its open position), to converge to a point 83 at the upper end of the outer cutter part 80. The edges 82 are preferably flat and substantially normal to the side surfaces of the side parts 79. Spaced openings 84 are provided in the walls of the cutter 78 to permit the contents of the can to freely drain out from around the cutter when the can has assumed its final open position on the cutter.

It is a feature of the invention that the inner side of the cover 58 constitutes a guide for guiding the can downwardly onto the cutter 78. A diametric portion of the cover 58 in longitudinal alignment with the cutter 78 is bent or curved to present a concaved face 85 opposing the outer part 80 of the cutter. The concaved face 85 preferably extends completely across the cover 58 and is engageable by the bead or exterior of the can when the can is moved downwardly onto the cutter 78.

It is believed that the operation of the embodiment of the invention illustrated in Figs. 1 to 5 of the drawings will be readily apparent from the foregoing description. The cover 58 may normally be in its closed position where it closes the upper end of the receptacle body 55 and when it is desired to pour or drain liquid into the receptacle, the cover may be readily swung to its open position. When the cover is in its open position, the open upper end of the container body 55 is unobstructed so that the receptacle may receive fluid from any source. If desired the cover 58 may be releasably locked in the open position by the pin 10. To open a sealed container or can and cause its contents to drain into the receptacle, the can is slid down the surface 85 on the inner side of the cover when in an inclined position so that its lower end strikes the point 83. The point 83 of the cutter is adapted to pierce the end wall of the can immediately adjacent its periphery so that the bead and side wall of the can are received between the outer cutter part 80 and the concaved surface 85 of the cover. The can may be readily forced downwardly on the cutter 78 to cause the diverging edges 82 at the upper end of the cutter to enlarge the opening started by the point 83 and so that the outer corners of the edges 82 extending along the side parts 79, cut or shear the wall of the can. The edges 82, in being flat, have extensive engagement with the edge portions of the flap outlined by the cut, causing the flap to be rolled upwardly and inwardly, leaving a clean entirely unobstructed opening in the wall which allows the entire contents of the can to quickly drain into the receptacle body 55. The can is supported in an inclined position on the cutter and cover after being opened so that its contents may quickly drain through the opening formed in its lowermost portion. The valve 68 is normally held closed by the spring 70 so that the flexible spout 56 may be moved or bent to any desired position for the discharge of the fluid from the receptacle without danger of premature discharge or leakage of the fluid. After the spout 56 has been positioned to discharge as desired, the lever 74 may be operated or depressed to open the valve 68 to allow the fluid to freely drain out from the receptacle body 55. The can may be easily detached from the cutter 78 after being drained of its contents, and if desired, the cover 58 may be returned to its closed position.

The embodiment of the invention illustrated in Figs. 6, 7, and 8 of the drawings, includes, generally, a receptacle body 86, a shiftable or swingable spout 87 on the body, valve means 88 operatively related with the spout 87, a cover 89 for the body 86, and means 90 on the cover for opening cans or sealed containers.

The receptacle body 86 has cylindrically curved side walls 91 and a substantially horizontal bottom wall 92 spaced above the lower end of the body. A suitable handle 93 is provided on the body 86. The spout 87 is an elongate rigid or unyielding tubular member having a laterally projecting portion 94 at its lower end projecting inwardly below the bottom wall 92 of the body. The pivotal or swingable mounting of the spout 87 includes a transversely disposed tubular member 95 in the body 86 below the wall 92. The member 95 is in communication with drain openings 96 in the bottom wall of the receptacle body. A sleeve 97 is provided on the inner end of the spout portion 94, and is rotatable or turnable on the member 95. The member 95 and sleeve 97 may be longitudinally tapered and the sleeve may be maintained in leak-tight engagement with the member by an adjustable means 98 urging it longitudinally toward the larger end of the member. With the mounting just described, the spout 87 may be swung between a substantially upright position and a down or inclined discharging position.

The valve means 88 is combined with the mounting of the spout 87 and includes a port 99 in the lower wall of the member 95 and a port 100 in the sleeve 97 communicating with the spout. The ports 99 and 100 are related so that the port 100 is out of communication with the port 99 when the spout is in its up position and remains out of communication with the port 99 until the spout is swung to its down or discharging position whereupon it communicates with the port 99 to allow for the free draining of liquid from the receptacle through the spout.

The cover 89 is provided to close the upper end of the receptacle body 86 against the entrance of dust and the like. The cover 89 is substantially disc-shaped and is proportioned so that the under side of its peripheral portion is adapted to seat on or engage the upper edge of the body. The central or major portion of the cover 89 may be depressed or indented as clearly illustrated in the drawings. A suitable hinge connection 101 connects the cover 89 with the body 86 so that the cover may be swung from its closed position to its open position. The hinge connection 101 is preferably located in vertical alignment with the handle 93. Stop lugs 102 are provided on the cover 89 at the hinged connection 101 to limit the outward swinging of the cover and stop it in a position where it is inclined downwardly and inwardly toward the center of the receptacle.

The means 90 for opening sealed containers or cans is carried by the cover 89 of the receptacle body and is made accessible or rendered operative when the cover is moved to its open position. The means 90 includes a cutter 78ª attached to or mounted on the inner surface of the cover 89. The cutter 78ª may be identical with the cutter 78 described above. The cutter 78ª has its lower end portion attached to the inner side of the cover at a point adjacent to and in longitudinal alignment with the hinged connection 101. The point 83ª on the upper end of the cutter faces upwardly when the cover is in its open position and is adapted to penetrate the end wall of a can forced downwardly onto the cutter. The inclined longitudinal edges 82ª of the cutter are operatable to enlarge the opening inwardly formed by the point 83ª and bend the flap, formed by the cut upwardly and inwardly leaving an unobstructed opening. The cover 89 is preferably shaped or formed to have a diametric concaved surface 105 on its inner side opposing the cutter 78ª. The surface 105 is operatable to guide the can downwardly on to the cutter.

The operation or use of the form of the invention illustrated in Figs. 6, 7, and 8 of the drawings is substantially the same as the form illustrated in Figs. 1 to 5. The cover 89 may be readily swung to its open position so that a can may be moved downwardly on the inner side of the cover 89 to have its lower end engage the point 83ª of the cutter. As the can is moved downwardly on the cutter, the edges 82ª enlarge the cut in width and length and roll the flap outlined by the cut inwardly and upwardly forming a large unobstructed opening in the end of the can. As this opening is in the lowermost portion of the can, the contents of the can may quickly and entirely drain into the receptacle 86. It will be apparent that the valve means 88 prevents the passage of fluid from the receptacle to the spout 87 until the spout has been swung downwardly to its discharging position.

Fig. 9 of the drawings illustrates a modified form of the invention involving a body 86ª similar generally to the body 86 just described, a cover 89ª on the body for closing its upper end, and a can opening cutter 82ᵇ on the under side of the cover. In this form of the invention, the receptacle body 86ª has an inwardly extending arched or convexed rim 110 on its upper end. A swingable valve controlling spout 87ª is provided to drain fluid from the body 86ª.

The cover 89ª is hingedly attached to or mounted on the arched rim 110 by a suitable hinged connection 111. The cover 89ª is shaped to effectively cooperate with the rim 110. The peripheral portion 112 of the cover 89ª is bent or curved inwardly presenting a concaved lower surface for engaging the arched rim 110. The inwardly curved peripheral portion 112 is such that the major or central portion of the cover 89ª is depressed. The cutter 82ᵇ may be identical with the cutters described above, and may be mounted on the inner side of the cover in any suitable manner. The cutter 82ᵇ is attached to or mounted on the inner side of the lower portion of the indented center part of the cover 89ª, and the cover may be formed to have a can-guiding surface similar to the surfaces 85 and 105 described above.

Fig. 10 of the drawings illustrates the invention embodied in a receptacle having an outwardly flaring lip or rim 120 on its upper edge and having a swingable valve-controlling discharge spout 121 similar in construction and operation to the spout 87. A cover 122 is hinged to the rim 120 to be operable between a position where it closes the upper end of the receptacle and an open position where it is inclined downwardly and inwardly toward the center of the receptacle. The cover 122 is shaped to effectively cooperate with the rim 120 having a flat normally peripheral part 123 for engaging the upper edge of the rim and having a depressed central portion 124 to fit downwardly into the rim when the cover is closed. A cutter 125 similar in construction and operation to the cutter 78 is mounted on the inner side of the cover portion 124. The cutter 125 is preferably located in vertical or longitudinal alignment with the hinged connection 126 of the cover and is positioned so that its lower end is adjacent the hinged connection when the cover is in the open position. The cover 122 is preferably provided with a can-guiding surface similar in position and operation to the surfaces 85 and 105.

Having described only typical forms and applications of my invention, I do not wish to be limited or restricted to the specific forms and applications herein set forth, but wish to reserve to myself any modifications or variations that may appear to those skilled in the art or fall within the scope of the following claims.

Having described my invention, I claim:

1. A device for handling fluids, including, an open-topped portable body, a discharge spout on the body, a shiftable cover for the upper end of the body, and means on the cover operable to cut an opening in a can forced against it when the cover is in an open position and thereafter support the can in position to drain into the body, said means including a cutter on the cover for penetrating a wall of the can, and a part on the cover which together with the cutter is operable to support the opened can.

2. A device for handling fluids including, a portable receptacle body having an open upper end, a discharge spout on the body, a hinged cover for the upper end of the body, and a cutter attached to the under side of the cover facing upwardly to open a can to drain into the receptacle body when the cover is in its open position.

3. A device for handling fluids including, an open-topped portable body, a discharge spout on the body, a hinged cover for the upper end of the body, a cutter on the inner side of the cover operatable to open a can when the cover is in an open position, and a face on the cover for guiding a can onto the cutter.

4. A device for handling fluids including, an open-topped portable body, a discharge spout on the body, a hinged cover for the upper end of the body, means for limiting the opening movement of the cover to stop it in a position inclined downwardly and forwardly relative to the vertical center of the body, and a cutter on the inner side of the cover operatable to cut an opening in a container pushed onto it.

5. A device for handling fluids including, a receptacle body having an open upper end, a discharge spout on the body, a hinged cover for closing the upper end of the body and movable to an open position, a cutter on the inner side of the cover inclined downwardly and inwardly toward the center of the body when the cover is in said position, and means on the cover for guiding a can downwardly and inwardly onto the cutter to be opened thereby.

6. A device of the character described, including an open-topped receptacle body, there being an outlet at the lower end of the body, a flexible spout extending from the outlet, a valve for controlling the flow into the spout, a pivoted cover for the upper end of the body, a cutter carried on the under side of the cover to cut an opening in a can forced against it when the cover is in an open position, and means on the under side of the cover for holding the opened can in position to drain into the body including the cutter and a part on the cover engageable by the can.

7. In combination, a portable receptacle having a hinged cover for closing its upper end, and a cutter arranged on the under side of the cover to cut an opening in the lower end of a can pushed onto it when the cover is in an open position whereby the can may drain into the receptacle.

8. In combination, a portable receptacle having a hinged cover for closing its upper end, and a cutter mounted on the inner side of the cover in spaced relation to its inner surface whereby said inner surface of the cover forms a guide for guiding a can onto the cutter when the cover is in an open position.

9. A device for handling fluids including, a receptacle body having an open upper end, a pivoted cover for closing the upper end of the body, a cutter on the inner side of the cover facing upwardly to cut an opening in a can when the cover is in an open position, and releasable means for holding the cover in such open position.

10. A device for handling fluids including, a receptacle body, a cover for closing the upper end of the body, a cutter on the inner side of the cover, and releasable means for holding the cover in an open position where the cutter faces upwardly and is inclined downwardly and inwardly toward the center of the receptacle to open a can forced onto it.

11. A device for handling fluids including, a receptacle body having an open upper end, a shiftable cover for closing the upper end of the body, a cutter mounted on the under side of the cover in spaced relation thereto whereby the under side of the cover presents a surface for guiding a can onto the cutter, and means for holding the cover in an open position where the cutter and said surface are inclined downwardly and inwardly toward the center of the receptacle.

12. A device of the character described including, a portable receptacle body, a movable cover for closing the upper end of the body, and means for opening cans including a cutter of substantially U-shaped cross section attached to the inner side of the cover, the cutter having its longitudinal edges converging to a point at what is the upper end of the cutter when the cover is in its open position, said point being operable to puncture the lower wall of a can forced against it to allow the can to drain into the receptacle body.

13. A device for handling fluids including, a receptacle body having an open upper end, a pivoted cover for closing the upper end of the body, there being a concave surface on the inner side of the cover, a cutter on the inner side of the cover in spaced relation to said surface, and means for holding the cover in an open position where said surface and the cutter are inclined downwardly and inwardly toward the center of the receptacle.

14. A device for handling fluids including, a receptacle body having an open upper end, a projecting rim on the upper end of the body, a pivoted cover on the body operatable to engage the rim to close the upper end of the body, a cutter attached to the inner side of the cover to puncture the lower end of a can forced against it when the cover is in an open position and means for guiding the can onto the cutter, the cutter and said means operating to hold the opened can in position to drain into the receptacle body.

15. A device of the character described including a receptacle body having an open upper end, a shiftable cover for closing the upper end of the body, and a cutter connected with the under side of the cover to be operative to open a can forced against it when the cover is in an open position, the cutter including parts to support the opened can in position to drain into the receptacle body.

OZRO N. WISWELL.